United States Patent Office 3,535,334
Patented Oct. 20, 1970

3,535,334
1-PIPERONOYL-3-INDOLYL ALIPHATIC ACID DERIVATIVES
Hisao Yamamoto, Nishinomiya-shi, Atsuko Misaki, Ibaragi-shi, and Takahiro Izumi, Takarazuka-shi, Japan, assignors to Sumitomo Chemical Company, Ltd., Osaka, Japan, a corporation of Japan
No Drawing. Filed Nov. 24, 1967, Ser. No. 685,284
Claims priority, application Japan, Dec. 7, 1966, 41/80,587, 41/80,588, 41/80,589
Int. Cl. C07d 27/56
U.S. Cl. 260—326.13                              8 Claims

ABSTRACT OF THE DISCLOSURE

Highly anti-inflammatory, anti-pyretic and analgesic 1-acyl-3-indolyl aliphatic acid derivatives of

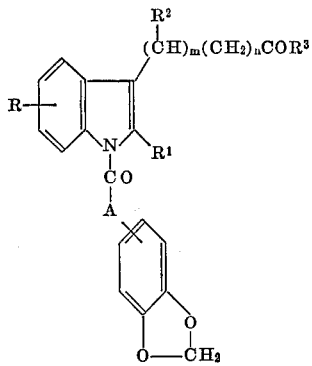

wherein R is hydrogen, lower alkyl, alkoxy, alkylthio group or halogen; $R^1$ and $R^2$ are hydrogen or lower alkyl group individually; $R^3$ is hydroxy, alkoxy, amino, benzyloxy or tetrahydropyranyloxy group; A is a hydrocarbon chain having 0–2 carbon atoms; $m$ is 0 or 1, $n$ is 0, 1, 2 or 3. One example is 1-piperonoyl-2-methyl-5-methoxy-3-indolylacetic acid. It is prepared by reacting

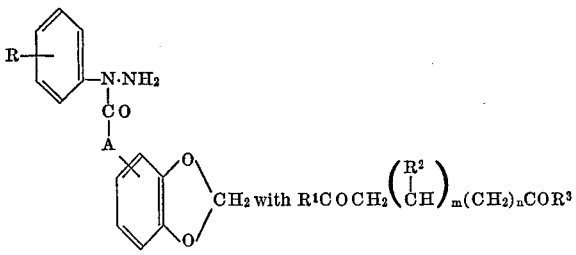

When $R^3$ is other than amino, it is prepared by reacting

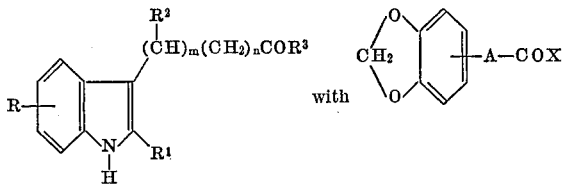

wherein X is halogen.

---

The present invention relates to novel 1-acyl-3-indolyl aliphatic acid derivatives having high anti-inflammatory, anti-pyretic and analgesic activities.

One object of the present invention is to provide novel 1-acyl-3-indolyl aliphatic acid derivatives having high anti-inflammatory, anti-pyretic and analgesic activities and process for producing such derivatives. Another object of the present invention is to provide processes for economically manufacturing these compounds in high yield. A further object of the present invention is to provide a novel pharmaceutical composition containing these compounds as the effective ingredient. Still further objects will be apparent from the following description.

In order to accomplish these objects, the present invention provides novel 1-acyl-3-indolyl aliphatic acid derivatives of the formula:

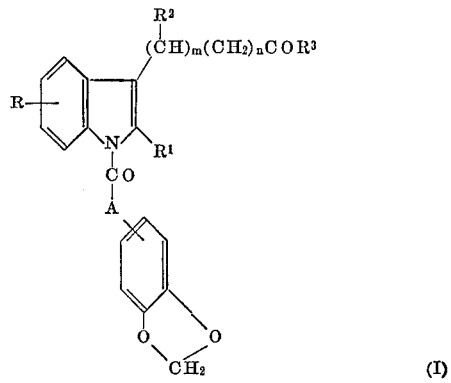

wherein R represents a hydrogen atom, lower alkyl, lower alkoxy, lower alkylthio group or halogen atom; A represents a hydrocarbon chain having 0–2 carbon atoms, $R^1$ and $R^2$ represent a hydrogen atom or lower alkyl group individually; $R^3$ represents a hydroxy, alkoxy amino benzyloxy or tetrahydropyranyloxy group; $m$ is 0 or 1, $n$ is 0, 1, 2 or 3.

Further, the present invention provides a process for producing novel 1-acyl-3-indolyl aliphatic acid derivatives represented by the Formula I, which comprises reacting an $N^1$-acylated phenylhydrazine derivative of the Formula II;

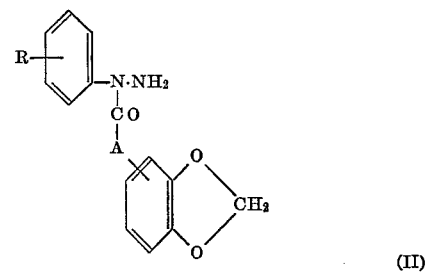

wherein R and A have the same significances as the Formula I, with a ketone compound represented by the Formula III;

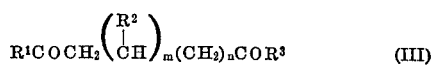

wherein $R^1$, $R^2$, $R^3$, $m$ and $n$ have the same significances as the Formula I in high yield.

Still further, the present invention provides a process for producing novel 1-acyl-3-indolyl aliphatic acid derivatives represented by the Formula I, which comprises decomposing an $N^1$-acylated phenylhydrazone derivative of the Formula IV:

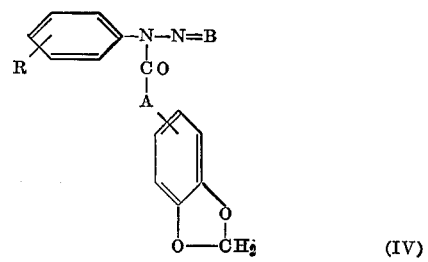

wherein R and A have the same significances as above and B represents a ketone residual group or an aldehyde residual group, by acid to give $N^1$-acylated phenylhydrazine derivative represented by the Formula II and salt thereof in high yield, and reacting the resultant $N^1$-acylated phenylhydrazine derivative with an aliphatic acid derivative represented by the Formula III to give the 1-acyl-3-indolyl aliphatic acid derivative (I).

Still further, the present invention provides a process for producing novel 1-acyl-3-indolyl aliphatic acid derivatives represented by the Formula I, which comprises reacting a phenylhydrazone derivative of the Formula V:

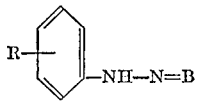

(V)

wherein R and B have the same significances as above, with an acid halide represented by the Formula VI:

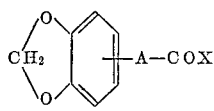

(VI)

wherein A has the same significance as above and X represents a halogen atom, to give the $N^1$-acylated phenylhydrazone derivative in high yield, and decomposing the resultant $N^1$-acylated phenylhydrazone derivative with a decomposing agent to give an $N^1$-acylated phenylhydrazine derivative represented by the Formula II, and reacting the resultant $N^1$-acylated phenylhydrazine derivative with an aliphatic derivative represented by the Formula III to give the 1-acyl-3-indolyl aliphatic acid derivative (I).

Still further, the present invention provides a process for producing novel 1-acyl-3-indolyl aliphatic acid derivatives represented by the Formula I, which comprises reacting a phenylhydrazine derivative of the Formula VII:

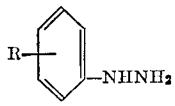

(VII)

wherein R has the same significance as above, with an acid halide represented by the Formula VI:

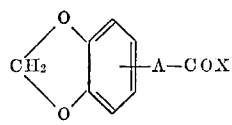

(VI)

wherein A and X have the same significances as above, to give $N^1$-acylated phenylhydrazine derivative represented by the Formula II and salt thereof in high yield, and reacting the resultant $N^1$-acylated phenylhydrazine derivative of the Formula II with an aliphatic acid compound of the Formula III to yield the 1-acyl-3-indolyl aliphatic acid compound (I).

Still further, the present invention provides a process for producing novel 1-acyl-3-indolyl aliphatic acid derivatives of the Formula VIII:

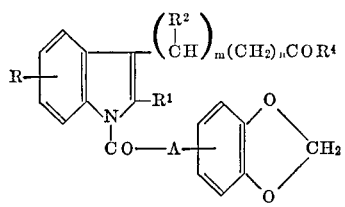

(VIII)

wherein R, $R^1$, $R^2$, A, $m$ and $n$ have the same significances as above and $R^4$ represents a hydroxy, alkoxy, benzyloxy or tetrahydropyranyloxy group. That is, 3-indolyl aliphatic acid derivatives of the Formula IX:

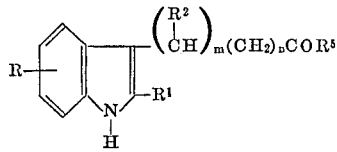

(IX)

wherein R, $R^1$, $R^2$, $m$ and $n$ have the same significances as above and $R^5$ represents an alkoxy, benzyloxy or tetrahydropyranyloxy group, is reacted with an acid halide represented by the Formula VI:

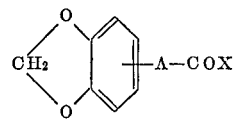

(VI)

wherein A and X have the same significances as above, and optionally by hydrolysis, heat degradation or reduction to give 1-acyl-3-indolyl aliphatic acid derivatives of the Formula VIII in good yield.

According to the present invention, a 1-acyl-3-indolyl aliphatic acid derivative represented by the Formula I is prepared by the reactions shown by the following equations:

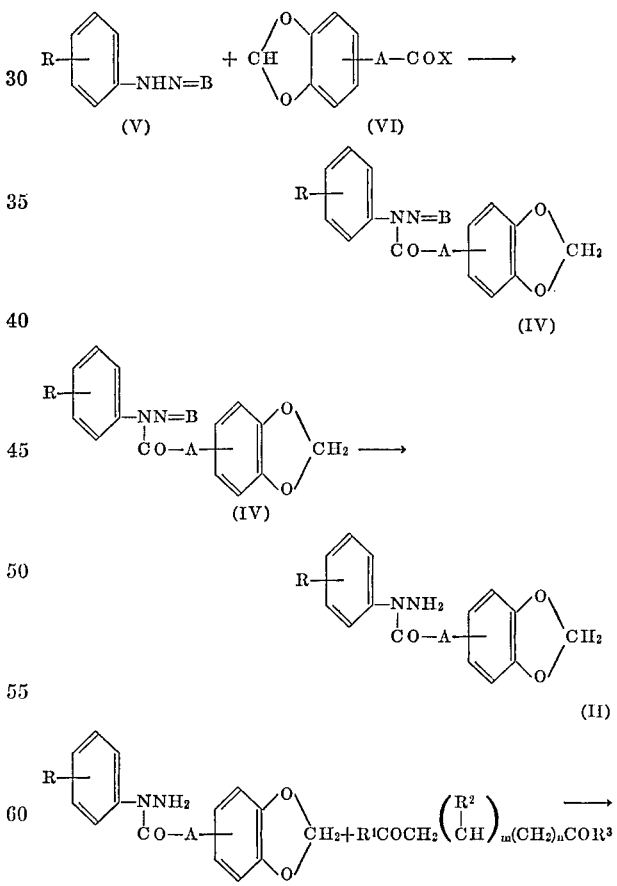

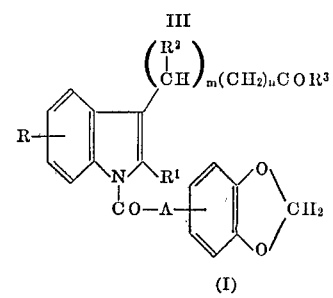

(I)

In the above formulas, R, R¹, R², R³, A, m, and n have the same meaning as identified above.

In the processes of the present invention N¹-acylated phenylhydrazine derivatives (II) and N¹-acylated phenylhydrazone derivatives (IV) may be synthesized as intermediates by other processes than those disclosed herein. These intermediates, the compounds (II) and (IV), are novel compounds.

Next, the process of the present invention is explained in due order as follows.

Firstly, the reaction of a phenylhydrazone derivative (V) and a compound (VI) will be described.

The reaction of a phenylhydrazone derivative (V) with a compound (VI) is carried out in the presence of a hydrogen halide acceptor. As the hydrogen halide acceptor, a tertiary amine, for example, pyridine, picoline, triethylamine or dimethylaniline can be used. These hydrogen halide acceptors themselves can be used as solvents. Inert solvents such as ether, benzene, toluene, xylene and tetrahydrofuran can also be used as reaction solvents in the presence of equimolar or larger amounts of these hydrogen halide acceptors. The compound (VI) may be chloride, bromide, iodide or fluoride; chlorride is most preferable from a commercial point of view. The reaction proceeds at room temperature in many cases, and even below 0° C. in some kind of solvent used. The exothermic reaction is complete in a few minutes to several hours. After the reaction is complete, the produced hydrogen halide salt of the hydrogen halide acceptor is filtered off and the filtrate is concentrated under a reduced pressure, or the reaction mixture is poured into water when a water-soluble solvent like pyridine is used as the solvent, and the aimed N¹-acylated phenylhydrazone compound is easily obtained as crystals or an oily substance. These products can be purified with an appropriate solvent, for example, the solvent mixture of alcohol and water.

When a compound having a comparatively weak —N=C< bonding is used as a derivative (V) or under severe conditions of reaction, an N¹-acylated phenylhydrazine derivative (II) is directly obtained in place of an N¹-acylated phenylhydrazone derivative (IV).

According to the method of the present invention, the following compounds can be obtained in high yield. As the N¹-acylated pheylhydrazone compounds (IV) there are illustrated:

Acetaldehyde N¹-(3',4'-methylenedioxycinnamoyl)-N¹-(p-methoxyphenyl)hydrazone
Acetaldehyde N¹-(piperonoyl)-N¹-(p-methoxylphenyl)hydrazone
Acetaldehyde N¹-(piperonoyl)-N¹-(p-chlorophenyl)hydrazone
Acetaldehyde N¹-(3',4'-methylenedioxycinnamoyl)-N¹-(p-chlorophenyl)hydrazone
Acetaldehyde N¹-(piperonoyl)-N¹-(p-fluorophenyl)hydrazone
Acetaldehyde N¹-(3',4'-methylenedioxycinnamoyl)-N¹-(p-fluorophenyl)hydrazone
Acetaldehyde N¹-(piperonoyl)-N¹-(p-tolyl)hydrazone
Acetaldehyde N¹-(3',4'-methylenedioxycinnamoyl)-N¹-(p-tolyl)hydrazone
Acetaldehyde N¹-(piperonoyl)-N¹-(p-ethylphenyl)hydrazone
Acetaldehyde N¹-(3',4'-methylenedioxycinnamoyl)-N¹-(p-ethylphenyl)hydrazone
Acetaldehyde N¹-(piperonoyl)-N¹-(p-ethylphenyl)hydrazone
Acetaldehyde N¹-(3',4'-methylenedioxycinnamoyl)-N¹-(p-ethoxyphenyl)hydrazone
Acetaldehyde N¹-(piperonoyl)-N¹-(p-methylthiophenyl)hydrazone
Acetaldehyde N¹-(3',4'-methylenedioxycinnamoyl)-N¹-(p-methylthiophenyl)hydrazone
Acetaldehyde N¹-(piperonoyl)-N¹-phenylhydrazone
Benzaldehyde N¹-(piperonoyl)-N¹-(p-methoxyphenyl) N¹-phenylhydrazone
Benzaldehyde N¹-(piperonoyl)-N¹-(p-methoxyphenyl) hydrazone
Benzaldehyde N¹-(3',4'-methylenedioxycinnamoyl)-N¹-(p-methoxyphenyl)hydrazone
Chloral N¹-(3',4'-methylenedioxycinnamoyl)-N¹-(p-methoxyphenyl)hydrazone
Chloral N¹-(piperonoyl)-N¹-(p-tolyl)hydrazone
Benzaldehyde N¹-(3',4'-methylenedioxycinnamoyl)-N¹-(p-chlorophenyl)hydrazone
Chloral N¹-(piperonoyl)-N¹-(p-chlorophenyl) hydrazone Those novel N¹-acylated phenylhydrazone derivatives which are obtained by the method of the present invention have psychic, stimulating, antitumor, bactericidal, and fungicidal effects and they are very important compounds as intermediates for producing remarkably effective anti-inflammatory drugs, analgesics and anti-pyretics.

Next, the process for producing an N¹-acylated phenylhydrazine derivative (II) by decomposing an N¹-acylated phenylhydrazone derivative (IV) will be described.

An N¹-acylated phenylhydrazone derivative (IV) is dissolved or suspended in an adequate solvent, for example, alcohol, ether, benzene or toluene. When alcohol is used, absolute alcohol achieves good yield. Then, more than equivalent of dry hydrogen chloride gas is absorbed into the resultant solution or the suspension. Then the HCl salt of the N¹-acylated phenylhydrazine derivative (II) precipitates as crystals in good yield. Sulfuric acid or others can be used in place of gaseous hydrogen chloride. When ether, benzene or toluene is used as the solvent, a small quantity of alcohol should be added to it. The reaction temperature is preferably 0°–25° C. though it may be below 0° C.

As the N¹-acylated phenylhydrazone derivative (IV), various compounds can be illustrated. For example, the hydrazones of acetaldehyde, chloral, benzaldehyde, acetal, ethyl acetoacetate and methoxy acetone can be easily cleaved in general cases to give the aimed N¹-acylated phenylhydrazine derivative (II). Among them, the hydrazone of acetaldehyde has especially distinctive commercial advantages.

According to the present invention, the following N¹-acylated phenylhydrazine derivatives (II), for example, can be obtained:

N¹-(3',4'-methylenedioxycinnamoyl)-N¹-(p-methoxyphenyl)hydrazine
N¹-piperonoyl-N¹-(p-chlorophenyl)hydrazine
N¹-piperonoyl-N¹-(p-methoxyphenyl)hydrazine
N¹-(3',4'-methylenedioxycinnamoyl)-N¹-(p-chlorophenyl)hydrazine
N¹-piperonoyl-N¹-(p-fluorophenyl)hydrazine
N¹-(3',4'-methylenedioxycinnamoyl)-N¹-(p-fluorophenyl)hydrazine
N¹-piperonoyl-N¹-(p-tolyl)hydrazine
N¹-(3',4'-methylenedioxycinnamoyl)-N¹-(p-tolyl)hydrazine
N¹-piperonoyl-N¹-(p-ethylphenyl)hydrazine
N¹-(3',4'-Methylenedioxycinnamoyl)-N¹-(p-ethylphenyl)hydrazine
N¹-Piperonoyl-N¹-(p-ethoxyphenyl)hydrazine
N¹-(3',4'-Methylenedioxycinnamoyl)-N¹-(p-ethoxyphenyl)hydrazine
N¹-Piperonoyl-N¹-(p-methylthiophenyl)hydrazine
N¹-(3',4'-Methylenedioxycinnamoyl)-N¹-(p-methylthiophenyl)hydrazine
N¹-Piperonoyl-N¹-phenylhydrazine hydrazine
N¹-(3',4'-Methylenedioxycinnamoyl)-N¹-phenyl- Their salts, for example, hydrochlorides, sulphates and phosphates, can be easily obtained. All of them are novel compounds that have not been reported in any literature.

These compounds have psychic, stimulating, antitumor, bactericidal and fungicidal activities and are very important as intermediates for producing strong anti-inflammatory drugs, analgesics and anti-pyretics.

In some cases the novel $N^1$-acylated phenylhydrazine derivatives (II) are directly obtained by reacting a phenylhydrazine derivative (VII),

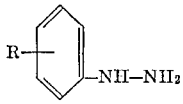

(VII)

wherein R has the same meaning as identified in the Formula I, or salts thereof, with a compound (VI)

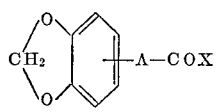

(VI)

wherein A has the same meaning as identified in the Formula I and X is a halogen atom in this case, in the presence of a basic reagent.

This reaction is carried out in a conventional solvent such as benzene, toluene, xylene, ether, dioxane or tetrahydrofuran in the presence of a dehydrogenhalide agent such as a tertiary amine. As the tertiary amine, triethyl amine, pyridine, picoline or dimethylaniline is suitable and the amount thereof is required preferably at least equal mole of the said phenylhydrazine derivative (VII).

This reaction proceeds so rapidly that the compound (VI) is added slowly to a phenylhydrazine derivative (VII) in a suitable solvent while cooling. The $N^1$-acylated derivative (II) thus obtained is contaminated with a by-product such as $N^2$-acylated compound or $N^1$, $N^2$-diacylated compound, however the objective $N^1$-acylated derivative (II) is separated and purified by removing the by-products by a suitable method such as column chromatography. However, the purification of the $N^1$-acylated compound is not necessary, because only the $N^1$-acylated derivative is concerned with the following reaction in the present invention.

According to the process of the present invention the compounds having the following substituents, which are represented by R and A in the said Formula II, VI and VII are obtained.

R: hydrogen, methyl, ethyl, isopropyl, methoxy, ethoxy, propioxy, chlorine, bromine, fluorine, methylthio, ethylthio and isopropylthio.

A: methylene, ethylene, vinylene and the linkage (—CO—A— shows —CO— group).

Lastly the process for producing a 1-acyl-3-indolyl aliphatic acid derivative (I) by the reaction of an $N^1$-acylated phenylhydrazine derivative (II) with an aliphatic acid derivative (III) will be described.

This reaction is carried out on heating in the presence or absence, of an adequate condensing agent and with or without an organic solvent. The yield is very high.

The present reaction proceeds smoothly without a solvent but it is preferable to use a suitable solvent in many cases. As the solvent, organic acids, for example, acetic acid, formic acid, propionic acid, lactic acid, butyric acid, non-polar organic solvents, for example, cyclohexane, n-hexane, benzene, toluene, and other organic solvents, such as dioxane and N,N-dimethyl formamide are used in the ring formation reaction. When an alcohol is used as a solvent in this reaction, a corresponding ester of indole aliphatic acid is produced. For example:

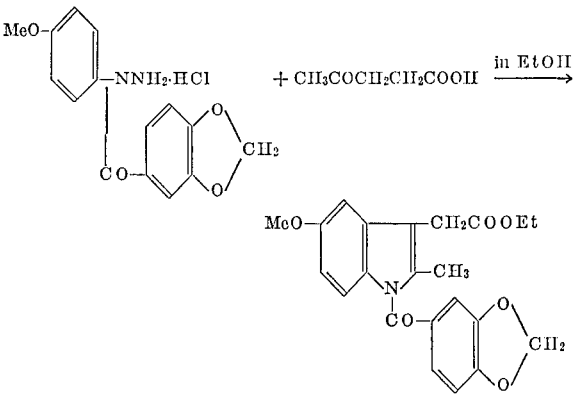

Generally, the reaction proceeds at a temperature within a range of 50° to 200° C., but a temperature within a range of 65° to 95° C. is preferable. The reaction proceeds rapidly and is generally completed in a short period of reaction time, mostly in one or two hours. The condensing agent is not needed in some cases but desirable results are generally achieved by using a condensing agent. The condensing agent includes inorganic acids such as hydrochloric acid, sulfuric acid and phosphoric acid, metal halides such as zinc chloride and copper chloride, heavy metal powder such as copper powder, Grignard's reagents, boron fluorides, polyphosphoric acid or ion-exchange resins. Hydrochloric acid or the like is required in an equimolar or larger amount, while copper powder or the like may be in a small amount.

In after-treatment, the reaction mixture is allowed to stand at room temperature or in a refrigerator (about 5° C.), and then a large amount of crystals of the product is obtained.

When crystals are not produced, the reaction mixture is concentrated under reduced pressure, or water, acetic acid-water or petroleum ether is adequately added to the mixture. And then, beautiful crystals can be obtained. Ether, acetone, acetone-water, alcohol, alcohol-water, benzene and acetic acid are generally preferred as a solvent for recrystallizing the present compound. The produced crystals are collected by filtration and, generally, they are washed with an aqueous solution of acetic acid, alcohol-water, water or petroleum ether before they are dried. Objective products are generally crystalline, but oily products are sometimes given in ester compounds.

Reaction solvents, reaction conditions, condensing agents and recrystallization solvents which have been mentioned above are only presented as illustrative of the present invention and are not limitative, in any way.

The following compounds are easily obtained in good yield, theoretical or nearly theoretical amount, according to the process of the present invention:

1-piperonoyl-2-methyl-5-methoxy-3-indolylacetic acid
1-piperonoyl-2-methyl-5-ethoxy-3-indolylacetic acid
1-piperonoyl-2-methyl-5-chloro-3-indolylacetic acid
1-piperonoyl-2-methyl-5-fluoro-3-indolylacetic acid
1-piperonoyl-2-methyl-5-ethyl-3-indolylacetic acid
1-piperonoyl-2,5-dimethyl-3-indolylacetic acid
1-piperonoyl-2-methyl-5-methylthio-3-indolylacetic acid
1-piperonoyl-2-methyl-5-methoxy-3-indolylacetamide
t-Butyl 1-piperonoyl-2-methyl-5-methoxy-3-indolylacetate
Ethyl 1-piperonoyl-2-methyl-5-methoxy-3-indolylacetate
Methyl 1-piperonoyl-2-methyl-5-methoxy-3-indolylacetate
Benzyl 1-piperonoyl-2-methyl-5-methoxy-3-indolylacetate
Tetrahydropyranyl 1-piperonoyl-2-methyl-5-methoxy-3-indolylacetate
γ-(1-piperonoyl-2-methyl-5-methoxy-3-indolyl)butyric acid
α-(1-piperonoyl-2-methyl-5-methoxy-3-indolyl)propionic acid β-(1-piperonoyl-2-methyl-5-methoxy-3-indolyl)propionic acid γ-(1-piperonoyl-2-methyl-5-methoxy-3-indolyl)propionic acid 1-(3′,4′-methylenedioxycinnamoyl)-2-methyl-5-methoxy-3-indolylacetic acid 1-(3′4′-methylenedioxycinnamoyl)-2-methyl-5-ethoxy-3-indolylacetic acid 1-(3′,4′-methylenedioxycinnamoyl)-2-methyl-5-chloro-3-indolylacetic acid 1-(3′,4′-methylenedioxycinnamoyl)-2-methyl-5-fluoro-3-indolylacetic acid 1-(3′,4′-methylenedioxycinnamoyl)-2-methyl-5-methylthio-3-indolylacetic acid 1-(3′,4′-methylenedioxycinnamoyl)-2,5-dimethyl-3-indolylacetic acid 1-(3′,4′-methylenedioxycinnamoyl)-2-methyl-5-ethyl-3-indolylacetic acid 1-(3′,4′-methylenedioxycinnamoyl)-2-methyl-3-indolylacetic acid 1-(3′,4′-methylenedioxycinnamoyl)-2-methyl-5-methoxy-3-indolylacetamide Methyl 1-(3′,4′-methylenedioxycinnamoyl)-2-methyl-5-methoxy-3-indolylacetate Ethyl 1-(3′,4′-methylenedioxycinnamoyl)-2-methyl-5-methoxy-3-indolylacetate t-Butyl 1-(3′,4′-methylenedioxycinnamoyl)-2-methyl-5-methoxy-3-indolylacetate Benzyl 1-(3′,4′methylenedioxycinnamoyl)-2-methyl-5-methoxy-3-indolylacetate Tetrahydropyranyl 1-(3′4′-methylenedioxycinnamoyl)-2-methyl-5-methoxy-3-indolylacetate γ-[1-(3′,4′-methylenedioxycinnamoyl)-2-methyl-5-methoxy-3-indolyl]butyric acid α-[1-(3′,4′-methylenedioxycinnamoyl)-2-methyl-5-methoxy-3-indolyl]propionic acid β-[1-(3′,4′-methylenedioxycinnamoyl)-2-methyl-5-methoxy-3-indolyl]propionic acid γ-[1-(3′,4′-methylenedioxycinnamoyl)-2-methyl-5-methoxy-3-indolyl]propionic acid Many other 1-acyl-3-indolyl aliphatic acid derivatives can be thus synthesized.

Still further, according to the present invention a 1-acyl-3-indolyl aliphatic acid derivative represented by the Formula VIII is prepared by reacting the 3-indolyl aliphatic acid derivative of the Formula IX with the compound of the Formula VI in the presence or absence of a suitable solvent, and in the presence or absence of a condensing agent.

The present reaction can proceed without solvent, occasionally, but generally is proceeds more smoothly in the presence of a suitable solvent. As the solvent, common organic solvents such as benzene, toluene, xylene, ether, tetrahydrofuran and N,N-dimethylformamide are used. In the presence of alkali metal compounds such as metallic sodium, metallic potassium, sodium amide, potassium amide, sodium hydride and lithium hydride as the condensing agent, the reaction proceeds smoothly to give the aimed compound in high yield.

The reaction temperature differes from the composition of the starting materials. It generally proceeds in the temperature range of −10°–200° C., but in order to smooth completion of the reaction, it is preferably carried out in the temperature range of 20°–150° C. The reaction is completed in 4–48 hours.

After the reaction is completed, the reaction mixture is allowed to cool, and a large amount of crystals are generally separate as precipiates. Even in the case which crystals are not produced, if the solvent is removed by distillation or water or petroleum ether is added to the reaction mixture, a large amount of crystals can be obtained. The crude crystals are collected by filtration, washed with water and thereafter recrystallized from a suitable solvent to give a pure objective product. In some cases, the reaction mixture is poured into water and extracted with a suitable organic solvent, and then a separated organic layer is dried and concentrated to a crude crystalline or oily substance, which is purified with column chromatography. The crude products are recrystallized from a suitable solvent.

Further the free acid thereof can be obtained by hydrolysis, heat decomposition or reduction of the acid ester of 1-acyl-3-indolyl aliphatic acid derivatives represented by the Formula VIII.

For example, in case, the acid ester is tertiary butylester or tetrahydropyranyl ester, the objective compound can be obtained by treating in the presence of aryl sulfonic acid, e.g. p-toluene sulfonic acid, to be hydrolized.

The objective compound can be obtained merely by decomposition of, i.e., by heating tertiary butylester.

For example:

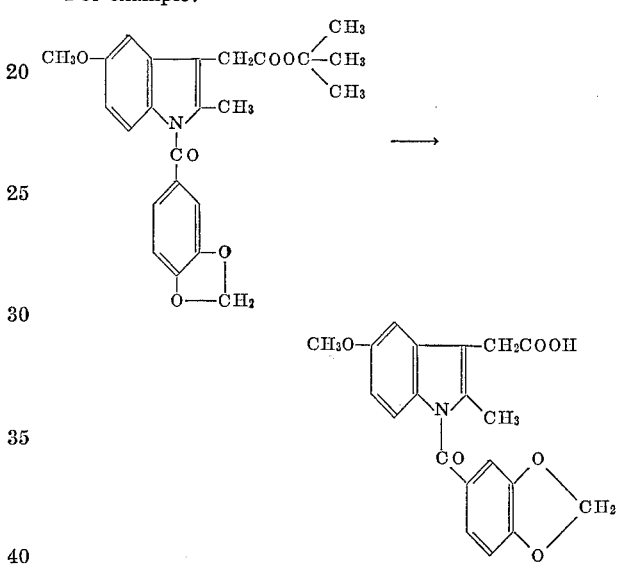

The benzyl or tetrahydropyranyl esters thereof is cleaved under the presence of a suitable metal catalyst such as palladium by hydrogenation to give free acid thereof. In this case, when an unsaturated bond exists on 1-acryl group, it can be saturated by hydrogenation.

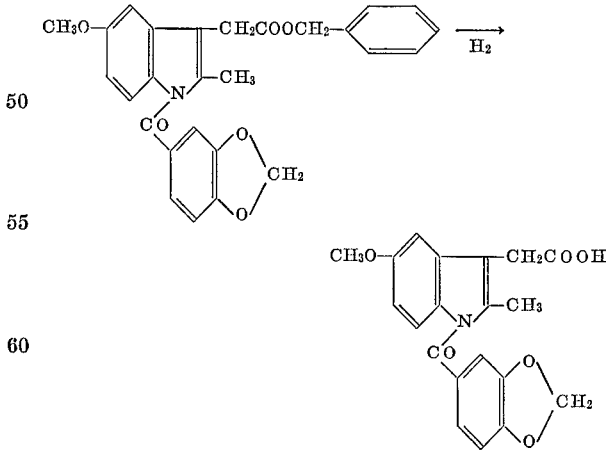

According to the process of the present invention, the compounds (VIII) and (IX) wherein R represents a hydrogen atom, methyl, ethyl, isopropyl, methoxy, ethoxy, methylthio, ethylthio, allylthio group, chlorine, bromine or fluorine atom; A represents a methylene, ethylene, vinylene or the linkage (—CO—A— shows —CO— group); $R_1$ and $R_2$ represent a hydrogen atom, methyl or ethyl group individually; $R_4$ represents a hydroxy, methoxy, ethoxy, iso-propoxy, t-butoxy, benzyloxy or tetrahydropyranyloxy group; $R_5$ represents a methoxy, ethoxy, iso-propoxy, t-butoxy, benzyloxy or tetrahydropyranyloxy group; $m$ is 0 or 1; and $n$ is 0, 1, 2 or 3, can be easily obtained.

Among novel 3-indolyl aliphatic acid derivatives of the present invention, there are many useful compounds, which indicate excellent anti-inflammatory activity but also possess extremely low toxicity.

In contrast to the above facts, the many compounds of this invention are markedly low in toxicity, and even when over 500 mg./kg. of these compounds are orally administered respectively to a rat and a mouse, they scarcely show toxic symptoms and occult bleeding is negative in feces thereof. Nevertheless, the activities of these compounds are much higher than those of 1,2-diphenyl-3,5-dioxo - 4 - n - butylpyrazolidine (phenylbutazone) and oxyphenbutazone. Therefore, the therapeutic ratios of the compounds of the present invention are far greater than any other drugs. Therefore, these compounds are markedly valuable in practical use.

The therapeutic ratios of these compounds of the present invention, 1-(p-chlorobenzoyl)-2-methyl-5-methoxy-3-indolylacetic acid (Indomethacin) and 1,2-diphenyl-3,5-dioxo-4-n-butylpyrazolidine (Phenylbutazone) are given in the following table.

TABLE

| Compound | Effects | | |
|---|---|---|---|
| | 50% inhibiting dose of carrageenin edema of rat's hind paw, per os (mg./kg.) | 50% lethal dose of rat, per os (mg./kg.) | Therapeutic ratio (50% lethal dose/50% inhibiting dose of carrageenin edema) |
| 1-(p-chlorobenzoyl)-2-methyl-5-methoxy-3-indolylacetic acid (Indomethacin) | 7.5 | 15 | 2.0 |
| 1,2-diphenyl-3,5-di-oxo-4-n-butyl-pyrazolidine(phenylbutazone) | 320 | Ca. 600 | Ca. 1.9 |
| 1-piperonoyl-2-methyl-5-methoxy-3-indolylacetic acid (present compound) | 40 | >1000 | >25 |
| 1-piperonoyl-2-methyl-5-chlor-3-indolylacetic acid (present compound) | 25 | >1000 | >40 |
| β-[1-piperonoyl-2-methyl-5-methoxy-9-3-indolyl]-propionic acid (present compound) | 250 | >1500 | >6.0 |

The present inventors prepared many other 1-acyl-3-indolyl aliphatic acid derivatives than the compounds shown in the aforesaid table and evaluated the pharmaceutical effects thereof by animal tests.

The present inventors have found that many derivatives (I) of 1-acyl-3-indolyl aliphatic acid, which are prepared by the present invention, are superior to 1-(p-chlorobenzoyl)-2-methyl-5-methoxy-3-indolylacetic acid (Indomethacin) and 1,2-diphenyl-3,5-dioxo-4-n-butylpyrazolidine (Phenylbutazone) in the therapeutic ratio thereof and has a great practical value.

It has been found that these compounds also have comparatively potent analgesic activities shown by Haffner's method, and antipyretic activities in a pyrogen test.

The following examples are given to illustrate the present invention more particularly but it is not intended to limit the present invention to them.

EXAMPLE 1

To a suspension of 5.0 g. of acetaldehyde p-methoxyphenylhydrazone in 56 ml. of dry ether was added 6.7 g. of piperonyl chloride in 40 ml. of ether at a temperature below 5° C. After addition was over, the mixture was stirred under ice cooling for 4 hours. Then separated crystals were filtered off, washed with water and dried to give 5.0 g. of crude crystals of acetaldehyde $N^1$-(piperonoyl)-$N^1$ - (p - methoxyphenyl)hydrazone, M.P. 122.5°–133.5° C.

EXAMPLE 2

According to the method of Example 1, crude crystals of acetaldehyde $N^1$-(piperonoyl)-$N^1$-(p-chlorophenyl)hydrazone were obtained. Melting point thereof was 127.0°–137.0° C.

EXAMPLE 3

To a suspension of 26.8 g. of acetaldehyde p-methoxyphenylhydrazone in 100 ml. of tetrahydrofuran was added 41.2 g. of 3,4-methylenedioxycinnamoylchloride in 250 ml. of tetrahydrofuran at a temperature below 5° C. After addition was over, the mixture was stirred for 4 hours under ice cooling and separated crystals were filtered off and dried to give 36.2 g. of acetaldehyde $N^1$-(3',4'-methylenedioxycinnamoyl) - $N^1$ - (p - methoxyphenyl) hydrazone having a melting point 171.5°–175.5° C.

EXAMPLE 4

According to the method of Example 3, crude crystals of acetaldehyde $N^1$-3',4'-methylenedioxycinnamoyl)-$N^1$-(p-tolyl)hydrazone were obtained. Melting point: 140.5°–143° C.

EXAMPLE 5

A suspension of 49.4 g. of acetaldehyde $N^1$-piperonoyl-$N^1$-(p-methoxyphenyl)hydrazone in 200 ml. of 99% ethanol was saturated with dry hydrochloric acid under ice cooling, and allowed to stand for a while. Then, insoluble matters were removed off and added 400 ml. of ether, and separated crystals were filtered off and dried to give 39.0 g. of $N^1$-piperonoyl-$N^1$-(p - methoxyphenyl)hydrazine hydrochloride, M.P. 175° C. (decomp.). Further, the filtrate was concentrated under reduced pressure and added ether again to give 7.7 g. of second crop of $N^1$-piperonyl-$N^1$-(p-methoxyphenyl)hydrazine hydrochloride, M.P. 172.5° C. (decomp.). Therefore, total yield of the compound was 46.7 g. (92.3%). By recrystallization from ether-ethanol, the melting point thereof was raised to 176.5° C. (decomp.).

Elementary analysis for $C_{15}H_{15}N_2O_4Cl$.—Calculated (percent): C, 55.82; H, 4.68; N, 8.68; Cl, 10.99. Found (percent): C, 55.95; H, 5.27; N, 8.51; Cl, 10.94.

Infrared absorption spectra $\nu_{max.}^{nujol}$ (cm.$^{-1}$); 2700, 2570, 1680, 1610

According to the method of Example 5, the following compounds can be obtained.

EXAMPLE 6

$N^1$ - (3',4' - methylenedioxycinnamoyl) - $N^1$ - (p - methoxyphenyl)hydrazine hydrochloride. Yield: 77.7%. Pale yellow rods, M.P. 181° C. (decomp.).

Elementary analysis for $C_{17}H_{17}N_2O_4Cl$.—Calculated (percent). C, 58.53; H, 4.91; N, 8.03; Cl, 10.17. Found (percent): C, 58.69; H, 5.27; N, 7.92; Cl, 9.97.

Infrared absorption spectra $\nu_{max.}^{nujol}$ (cm.$^{-1}$): 2600, 1689, 1625, 1600

EXAMPLE 7

$N^1$-piperonoyl-$N^1$ - (p - chlorophenyl)hydrazine hydrochloride. Yield: 64.1%. Colorless needles, M.P. 175°–175.5° C.

Elementary analysis for $C_{14}H_{12}N_2O_3Cl_2$.—Calculated (percent): C, 51.39; H, 3.70; N, 8.56; Cl, 21.68. Found (percent): C, 51.38; H, 3.59; N, 8.54; Cl, 22.05.
Infrared absorption spectra $\nu_{max.}^{Nujol}$ ($cm^{-1}$): 2700, 1613, 1605

EXAMPLE 8

$N^1$-(3',4'-Methylenedioxycinnamoyl) - $N^1$ - (p - tolyl)-hydrazine hydrochloride. Yield: 94.2%. Colorless needles, M.P. 187.5°–188° C. (decomp.)
Elementary analysis for $C_{17}H_{17}N_2O_3Cl$.—Calculated (percent): C, 61.35; H, 5.15; N, 8.42; Cl, 10.65. Found (percent): C, 60.78; H, 5.31; N, 8.30; Cl, 10.53.
Infrared absorption spectra $\nu_{max.}^{Nujol}$ ($cm^{-1}$): 2750, 2600, 1670, 1640, 1630, 1605, 1595

EXAMPLE 9

To a suspension of 3.5 g. of p-methoxyphenyl-hydrazine hydrochloride in 25 ml. of absolute ether was added 2.3 g. of triethylamine and reacted for 2 hours at room temperature. Then, 4.4 g. of piperonyl chloride in 10 ml. of tetrahydrofuran was added dropwise under ice-cooling at a temperature below 5° C. and allowed to stand under ice-cooling for 3 hours and then continued to stand at room temperature for additional one hour with stirring. After reaction was complete, separated crystals were removed by filtration, and the filtrate was extracted with methylene chloride. Solvent of the organic layer was distilled to give 3.8 g. of a brown oily substance.

Recrystallization from ethanol afforded colorless needles of $N^1$-(piperonoyl) - $N^1$ - (p-methoxyphenyl)hydrazine, M.P. 86°–88° C.
Elementary analysis for $C_{15}H_{14}N_2O_4$.—Calculated (percent): C, 62.93; H, 4.93; N, 9.79. Found (percent): C, 63.52; H, 4.76; N, 9.63.
Infrared absorption spectra $\nu_{max.}^{Nujol}$ ($cm^{-1}$): 3350, 3200, 1640, 1600.

EXAMPLE 10

According to the method of Example 9, $N^1$-(3',4'-methylenedioxycinnamoyl)-$N^1$ - (p - methoxyphenyl)hydrazine was obtained as pale yellow scale, M.P. 181.5°–182.5° C.
Elementary analysis for $C_{17}H_{16}N_2O_4$.—Calculated (percent): C, 65.37; H, 5.16; N, 8.97. Found (percent): C, 66.00; H, 4.81; N, 9.17.
Infrared asborption spectra $\nu_{max.}^{Nujol}$ ($cm^{-1}$): 3350, 3200, 1640, 1605, 1580.

EXAMPLE 11

$N^1$-(piperonoyl)-$N^1$ - (p-chlorophenyl)hydrazine, M.P. 109.5°–112° C. Colorless needles.
Elementary analysis for $C_{14}H_{11}N_2O_3Cl$.—Calculated (percent): C, 57.84; H, 3.81; N, 9.64; Cl, 12.20. Found (percent): C, 58.21; H, 3.72; N, 9.91; Cl, 12.32.
Infrared absorption spectra $\nu_{max.}^{Nujol}$ ($cm^{-1}$): 3360, 3230, 1645, 1608, 1590.

EXAMPLE 12

$N^1$-(3',4'-methylenedioxycinnamoyl) - $N^1$ - (p - tolyl)-hydrazine, M.P. 169.5°–171° C. Pale yellow needles.
Elementary analysis for $C_{17}H_{16}N_2O_3$.—Calculated (percent): C, 68.90; H, 5.44; N, 9.45. Found (percent): C, 69.24; H, 5.45; N, 9.71.
Infrared absorption spectra $\nu_{max.}^{Nujol}$ (cm.$^{-1}$): 3330, 3200, 1650, 1640, 1603, 1590.

EXAMPLE 13

To a solution of 1.6 g. of $N^1$-(piperonoyl)-$N^1$-(p-methoxyphenyl)hydrazine hydrochloride in 15 ml. of glacial acetic acid was added 0.7 g. of levulinic acid and heated at 70°–75° C. for 5 hours. After the reaction was completed, the reaction mixture was condensed under reduced pressure and water was added to the residue and separated crystals were collected by filtration to give 1.7 g. of crude 1-piperonoyl - 2 - methyl-5-methoxy-3-indolyl acetic acid (Yield: 93%).

Recrystallization from 99% ethanol gave 1.5 g. of yellow needles of the pure product (Yield: 82%); M.P. 160.5°–162° C.
Elementary analysis for $C_{20}H_{17}NO_6$.—Calculated (percent): C, 65.39; H, 4.66; N, 3.81. Found (percent): C, 64.88; H, 4.77; N, 3.53.
Infrared absorption spectra $\nu_{max.}^{Nujol}$ (cm.$^{-1}$): 1725, 1643, 1612.

EXAMPLE 14

A solution of 1.6 g. of $N^1$-(piperonoyl)-$N^1$-(p-methoxyphenyl)hydrazine hydrochloride in 15 ml. of glacial acetic acid was added 0.7 g. of γ-acetyl butyric acid and heated at 70°–75° C. for 3 hours with stirring. Then the mixture was allowed to stand in a refrigerator. Separated crystals were filtered, washed with water and dried to give 2.1 g. of 1-piperonoyl-2-methyl-5-methoxy-3-indolyl propionic acid quantitatively, M.P. 164°–165° C. Recrystallization from 70% ethanol gave 1.6 g. of pure product as colorless needles (Yield: 85%). The melting point raised to 165°–166° C.
Elementary analysis for $C_{21}H_{19}NO_6$.—Calculated (percent): C, 66.13; H, 5.02; N, 3.67. Found (percent): C, 66.16; H, 5.09; N, 3.81.
Infrared absorption spectra $\nu_{max.}^{Nujol}$ (cm.$^{-1}$): 1712, 1639, 1632, 1600

EXAMPLE 15

A suspension of 1.8 g. of $N^1$-(3',4'-methylene-dioxycinnamoyl)-$N^1$-(p-methoxyphenyl)hydrazine hydrochloride in 6.4 g. of levulinic acid was heated at 75°–80° C. for 3 hours with stirring. After the reaction was complete the reaction mixture was poured into water and the water-insoluble oily substances was purified by silica-gel columnchromatography developed with methylene chloride to give 1.7 g. of crude crystals of 1-(3',4'-methylene-dioxycinnamoyl)-2-methyl-5-methoxy - 3 - indolyl acetic acid, M.P. 195°–201° C. (Yield: 84.1%). Recrystallization from ethanol gave yellow needles, M.P. 201°–203° C.
Elementary analysis for $C_{22}H_{19}NO_6$.—Calculated (percent): C, 67.17; H, 4.87; N, 3.56. Found (percent): C, 67.07; H, 4.73; N, 3.27.
Infrared absorption spectra $\nu_{max.}^{Nujol}$ (cm.$^{-1}$): 1740, 1648, 1616, 1608.

EXAMPLE 16

A suspension of 1.6 g. of $N^1$-(piperonoyl)-$N^1$-(p-chlorophenyl)hydrazine hydrochloride in 6.4 g. of levulinic acid was heated at 75°–80° C. for 7 hours with stirring. After the reaction was completed, the reaction mixture was poured into water and extracted with ether, which was distilled under reduced pressure to give 2.0 g. of orange-yellow oily residue. It was purified with silica gel column chromatography developed methylene chloride to give 1.5 g. of crude crystals of 1-(piperonoyl)-2-methyl-5-chloro-3-indolyl acetic acid, M.P. 174°–176.5° C. (Yield: 81%). Recrystallization from ethanol gave colorless prisms, M.P. 178.5°–180° C.
Elementary analysis for $C_{19}H_{14}NO_5Cl$.—Calculated (percent): C, 61.38; H, 3.80; N, 3.77; Cl, 9.54. Found (percent): C, 61.07; H, 3.91; N, 3.77; Cl, 9.60.
Infrared absorption spectra $\nu_{max.}^{Nujol}$ (cm.$^{-1}$): 1710, 1683, 1613.

EXAMPLE 17

Under nitrogen gas stream, 0.9 g. of 50% purity of sodium hydride was washed with n-hexane for three times and 30 ml. of N,N-dimethyl formamide was added to it, and then 3 g. of 2-methyl-5-methoxy-3-indolyl acetic acid ethylester in 10 ml. of N,N-dimethylformamide was added dropwise therein at a temperature below 10° C. under ice-cooling and reacted with stirring for three hours at room temperature to give 2-methyl-5-methoxy-3-indolyl acetic acid ethyl ester sodium salt. The reaction product was then cooled with ice, and the solution of 2.7 g. of piperonyl chloride in 5 ml. of tetrahydrofuran was added dropwise at a temperature below 10° C. and reacted for 24 hours at room temperature. After reaction was completed, the reaction mixture was poured into 150 ml. of ice water, extracted with ether, and solvent of the organic layer was distilled to give 4.2 g. of orange oily substance. The product was column chromatographed and eluted with benzene to give 1.3 g. of yellow oily substance of 1-piperonoyl-2-methyl-5-methoxy - 3 - indolyl acetic acid ethyl ester. Crystallization from ether, gave the compound, M.P. 111°–115° C., which was recrystallized from ethanol were to give pale yellow needles, M.P. 115.5°–116.5° C.

Elementary analysis for $C_{22}H_{21}NO_6$.—Calculated (percent): C, 66.82; H, 5.35; N, 3.54. Found (percent): C, 67.20; H, 5.20; N, 3.48.

Infrared absorption spectra $\nu_{max.}^{Nujol}$ (cm.$^{-1}$): 1740, 1680, 1607.

What we claim is:

1. A 1-piperonoyl-3-indolyl aliphatic acid of the formula,

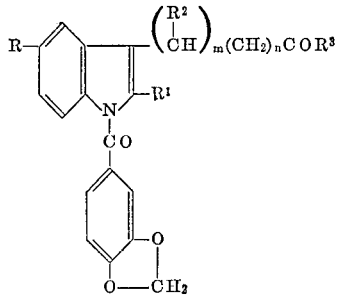

wherein R represents a hydrogen or halogen atom, lower alkyl, lower alkoxy or lower alkylthio; $R^1$ and $R^2$ represent a hydrogen atom, methyl or ethyl individually; $R^3$ represents hydroxy, lower alkoxy, benzyloxy or tetrahydropyranyloxy; $m$ is 0 or 1 and $n$ is 0, 1, 2, or 3.

2. A 1-piperonoyl-3-indolyl aliphatic acid derivative of the formula,

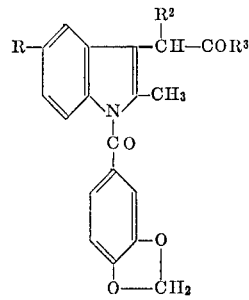

wherein R represents a methoxy group or a halogen atom, $R^2$ represents a hydrogen atom or a methyl group, and $R^3$ represents a hydroxyl group or a methoxy group.

3. A 1-piperonoyl-3-indolyl aliphatic acid derivative of the formula,

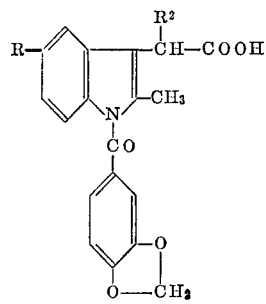

wherein R represents a methoxy group or chlorine atom and $R^2$ represents a hydrogen atom or a methyl group.

4. A compound according to claim 3 wherein $R^2$ is hydrogen.

5. A compound according to claim 3 wherein R is chlorine.

6. 1 - piperonoyl - 2 - methyl - 5 - methoxy - 3 -indolylacetic acid.

7. 1 - piperonoyl - 2 - methyl - 5 - chloro - 3 - indolylacetic acid.

8. β-(1 - piperonoyl - 2 - methyl - 5 - methoxy - 3 - indolyl)-propionic acid.

References Cited

UNITED STATES PATENTS 3,271,394  9/1966  Shen _____ 260—247.2

ALEX MAZEL, Primary Examiner

J. A. NARCAVAGE, Assistant Examiner

U.S. Cl. X.R.

260—240, 326.12, 340.5; 424—274, 282